(12) United States Patent
Menezes et al.

(10) Patent No.: US 10,229,674 B2
(45) Date of Patent: Mar. 12, 2019

(54) CROSS-LANGUAGE SPEECH RECOGNITION AND TRANSLATION

(71) Applicant: Microsoft Technology Licensing, LLC, Redmond, WA (US)

(72) Inventors: Arul A. Menezes, Bellevue, WA (US); Hany M. Hassan Awadalla, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 14/714,046

(22) Filed: May 15, 2015

(65) Prior Publication Data

US 2016/0336008 A1 Nov. 17, 2016

(51) Int. Cl.
*G06F 17/27* (2006.01)
*G06F 17/28* (2006.01)
*G10L 15/06* (2013.01)
*G10L 15/19* (2013.01)
*G10L 15/187* (2013.01)

(52) U.S. Cl.
CPC .......... *G10L 15/187* (2013.01); *G06F 17/278* (2013.01); *G06F 17/2818* (2013.01); *G10L 15/06* (2013.01); *G10L 15/19* (2013.01); *G10L 2015/0633* (2013.01)

(58) Field of Classification Search
CPC ....... G10L 15/06; G10L 15/187; G10L 15/19; G10L 2015/0633; G06F 17/278; G06F 17/2818
See application file for complete search history.

(56) References Cited

U.S. PATENT DOCUMENTS

| | | | |
|---|---|---|---|
| 6,311,152 B1 | 10/2001 | Bai et al. | |
| 7,149,688 B2 | 12/2006 | Schalkwyk | |
| 7,165,019 B1 * | 1/2007 | Lee | G06F 17/2715 704/10 |

(Continued)

FOREIGN PATENT DOCUMENTS

| | | |
|---|---|---|
| CN | 103309926 A | 9/2013 |
| WO | WO03088080 A1 | 10/2003 |

OTHER PUBLICATIONS

Chen, et al., "Translating-Transliterating Named Entities for Multilingual Information Access", In Journal of American Society for Information Science and Technology, vol. 57, Issue 5, Mar. 1, 2006, 15 pages.

(Continued)

*Primary Examiner* — Walter Yehl
(74) *Attorney, Agent, or Firm* — Schwegman Lundberg & Woessner, P.A.

(57) ABSTRACT

Technologies are described herein for cross-language speech recognition and translation. An example method of speech recognition and translation includes receiving an input utterance in a first language, the input utterance having at least one name of a named entity included therein and being pronounced in a second language, utilizing a customized language model to process at least a portion of the input utterance, and identifying the at least one name of the named entity from the input utterance utilizing a phonetic representation of the at least one name of the named entity. The phonetic representation has a pronunciation of the at least one name in the second language.

20 Claims, 7 Drawing Sheets

(56) References Cited

U.S. PATENT DOCUMENTS

| | | | |
|---|---|---|---|
| 7,249,013 B2 | 7/2007 | Al-Onaizan et al. | |
| 8,239,207 B2 | 8/2012 | Seligman et al. | |
| 8,311,828 B2* | 11/2012 | Arrowood | G06F 17/30746 704/254 |
| 9,613,618 B2* | 4/2017 | Chakladar | G01C 21/3664 |
| 9,614,969 B2* | 4/2017 | Aue | H04M 3/568 |
| 9,640,173 B2* | 5/2017 | Pulz | G10L 13/086 |
| 9,747,895 B1* | 8/2017 | Jansche | G10L 15/183 |
| 2001/0029455 A1* | 10/2001 | Chin | G06F 17/273 704/277 |
| 2003/0009320 A1 | 1/2003 | Furuta | |
| 2003/0088397 A1* | 5/2003 | Karas | G06F 17/30017 704/1 |
| 2005/0165602 A1* | 7/2005 | Cote | G10L 15/183 704/9 |
| 2006/0112091 A1* | 5/2006 | Chapman | G06F 17/30669 |
| 2007/0021956 A1 | 1/2007 | Qu et al. | |
| 2008/0071518 A1* | 3/2008 | Narayanan | G06F 17/278 704/2 |
| 2009/0292538 A1* | 11/2009 | Barnish | G10L 15/05 704/232 |
| 2010/0217582 A1* | 8/2010 | Waibel | G06F 17/2809 704/7 |
| 2011/0307241 A1* | 12/2011 | Waibel | G10L 15/265 704/2 |
| 2012/0029904 A1* | 2/2012 | Precoda | G10L 15/06 704/2 |
| 2013/0197896 A1* | 8/2013 | Chalabi | G06F 17/2735 704/2 |
| 2013/0197906 A1 | 8/2013 | Varkey et al. | |
| 2013/0346077 A1* | 12/2013 | Mengibar | G10L 15/265 704/235 |
| 2014/0039879 A1 | 2/2014 | Berman | |
| 2015/0012260 A1* | 1/2015 | Chakladar | G01C 21/3664 704/9 |
| 2015/0340024 A1* | 11/2015 | Schogol | G10L 15/26 704/235 |
| 2015/0347399 A1* | 12/2015 | Aue | G06F 17/289 704/2 |
| 2015/0350451 A1* | 12/2015 | Aue | H04M 3/568 379/202.01 |
| 2017/0047060 A1* | 2/2017 | Liu | G10L 13/10 |

OTHER PUBLICATIONS

Virga, et al., "Transliteration of Proper Names in Cross-Language Applications", In Proceedings of 26th Annual International ACM SIGIR Conference on Research and Development in Information Retrieval, Jul. 28, 2003, 2 pages.

* cited by examiner

CROSS-LANGUAGE SPEECH RECOGNITION AND TRANSLATION

BACKGROUND

Communications systems have evolved to include easily accessible communication applications that allow users from disparate geographic locations to readily communicate. Furthermore, efficiencies in distributed computing systems have allowed cloud-computing-based communication systems to facilitate real-time communication via audio and video means. For example, video chatting and audio chatting applications for communicating across the Internet are relatively commonplace. The chatting and other communication applications allow face-to-face and audio communication between users at neighborly, metropolitan, transcontinental, and worldwide distances.

However, even if users are separated only by a marginal distance, and even as communication systems reduce transit-time of relayed information for longer distances, language differences between users utilizing the communication systems may still affect the usage of communication systems. For example, if a first user speaking a first language attempts to communicate with a second user speaking a second language, one or both users may need to translate utterances to understand one another. The utterances may include names of people or geographic locations typically pronounced in a specific manner or dependent upon cultural or regional preferences. Accordingly, if the translated utterances do not take into consideration the specific preferences of pronunciation, the users may be unable to understand each other, thereby negating the effectiveness of the communication system.

SUMMARY

The techniques discussed herein facilitate cross-language speech recognition and translation. As described herein, various methods and systems of cross-language speech recognition and translation are provided.

According to one example, a device for speech recognition comprising a speech recognition component deployed thereon and configured to receive an input utterance in a first language, the input utterance having at least one name of a named entity included therein and being pronounced in a second language, utilize a customized language model to process at least a portion of the input utterance, and identifying the at least one name of the named entity from the input utterance utilizing a phonetic representation of the at least one name of the named entity, the phonetic representation having a pronunciation of the at least one name in the second language.

According to another example, a method of speech recognition and translation for processing utterances in both a first language and a second language comprises performing computer-implemented operations at a computing network including categorizing names of named entities associated with a first user, the names being in the first language, constructing a lexicon of phonetic pronunciations of the names for the named entities, the lexicon including a plurality of pronunciations in the first language and the second language, constructing a customized language model for each type of named entity of the named entities, and processing utterances received from the first user in the first language to recognize names of named entities, the names of named entities comprising names pronounced in the second language.

According to another example, a speech recognition and translation system is configured to translate a first utterance in a first language into a second utterance in a second language. The system comprises at least one computer executing a speech recognition component configured to receive an input utterance in the first language, the input utterance having at least one name of a named entity included therein, utilize a customized language model or a generic language model to translate a portion of the input utterance into an output utterance in the second language, identify the at least one name of the named entity from the input utterance, determine a phonetic representation of the at least one name of the named entity to the output utterance, the phonetic representation having a pronunciation of the at least one name in the second language, and output the output utterance according to the phonetic representation.

The above-described subject matter may also be implemented in other ways, such as a computer-controlled apparatus, a computer process, a computing system, or as an article of manufacture such as a computer-readable storage medium, for example. Although the technologies presented herein are primarily disclosed in the context of cross-language speech recognition, the concepts and technologies disclosed herein are also applicable in other forms including development of a lexicon for speakers sharing a single language or dialect. Other variations and implementations may also be applicable. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
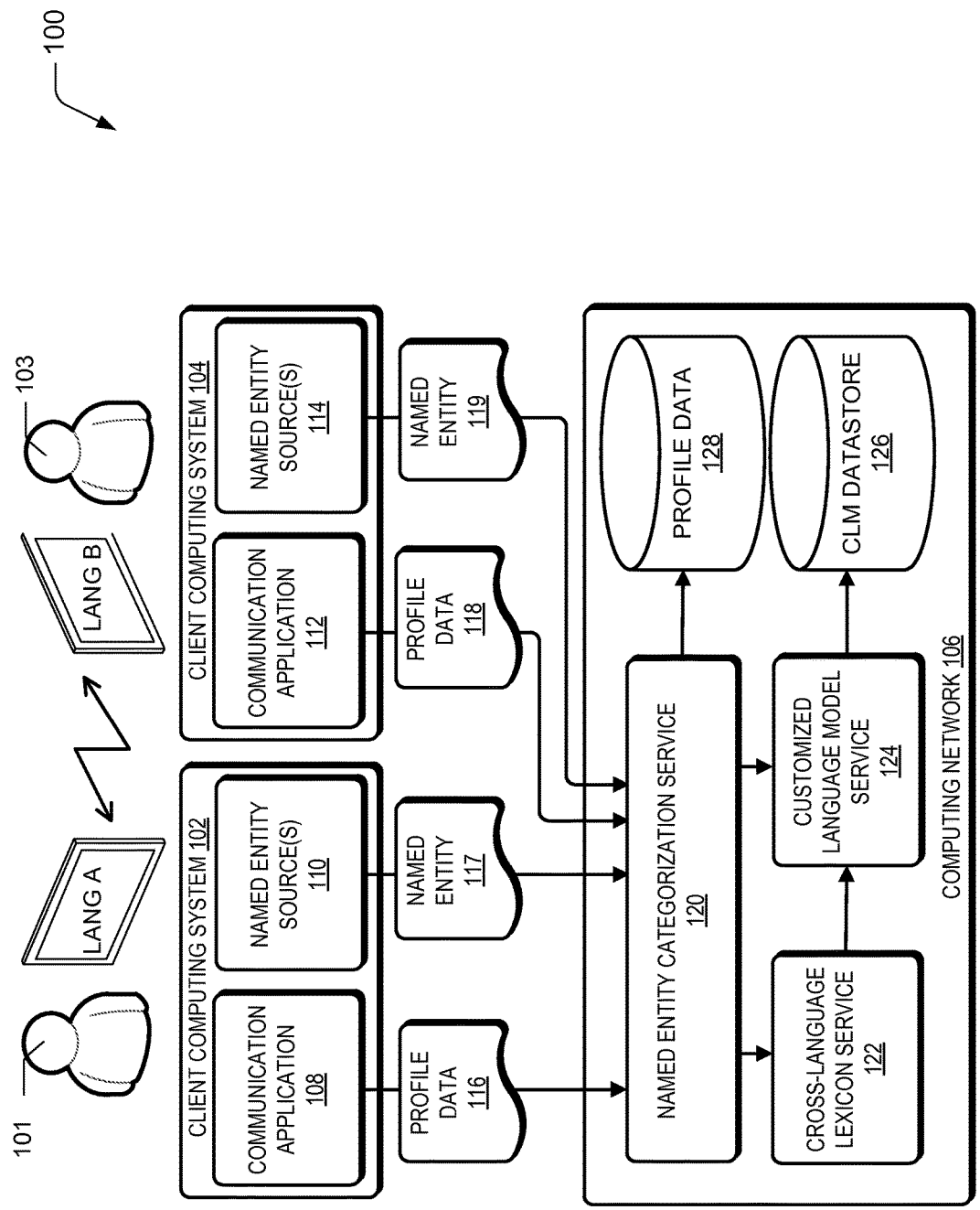
FIG. 1A is a diagram showing aspects of an illustrative operating environment and several logical components provided by the technologies described herein.

The following detailed description is directed to technologies for cross-language speech recognition and translation. The use of the technologies and concepts presented herein enable accurate recognition and translation of utterances in a conversation between two entities. Furthermore, in some examples, the described technologies may also increase efficiency of real-time translation based on profile data and initial lexicon. These technologies employ customized language models that intelligently augment generic language models to improve cross-language recognition and translation.

As an example scenario useful in understanding the technologies described herein, if a first user speaking a first language attempts to communicate with a second user speaking a second language, one or both users may need to translate utterances in order to understand each other. The utterances include, among other things, names of people or geographic locations typically pronounced in a specific manner or dependent upon cultural or regional preferences. According to the technologies described herein, a plurality of named entities associated with the first user and the second user may be collected.

As used herein, the phrase "named entity," and variants thereof, corresponds to an entity having a rigid designator (e.g., a "name") that denotes that entity in one or more possible contexts. For example, Mount Everest is a named entity having the rigid designator or name of "Mount Everest" or "Everest." Similarly, the person Henry Ford is a person having the name "Henry Ford." Other named entities such as a Ford Model T, the city of Sacremento, and other named entities also utilize names to refer to particular people, locations, things, and other entities. Still further, particular people, places or things may be named entities in some contexts, including contexts where a single designator denotes a well-defined set, class, or category of objects rather than a single unique object. However, generic names such as "shopping mall" or "park" may not refer to particular entities, and therefore may not be considered names of named entities.

As discussed above, the named entities can include names of people, locations, things, and potentially other named entities. The collected named entities can be categorized based on the type of named entities. For example, names of people can be categorized as Person Names while name of geographic locations can be categorized as Location Names. The categorization can be facilitated through identification of a source of the named entities, such as a contact list containing names and address information, location information derived from coordinates or map data, a context of prior conversations of one or both of the first user and the second user, textual information from text-based communications associated with one or both of the first user and the second user, and potentially other sources. Upon categorization, the categorized named entities may be stored as a portion of profile data for the first user and the second user.

Stored or newly updated categorized named entities and profile data may be accessed by a cross-language lexicon service and a customized language model service upon initiation of a communication channel between the first user and the second user. The cross-language lexicon service may combine the categorized named entities for both users. Using the combined categorized named entities, the cross-language lexicon service constructs a lexicon for the initialized communication channel with a pronunciation of at least a portion of the named entities in both the first language and the second language. This facilitates correct recognition and pronunciation of named entities in either language and reduces miscommunication.

The customized language model service utilizes the categorized named entities to build a customized language model for real-time speech recognition and translation. The customized language model can include a context-free language model, an n-gram language model, or a class-based language model. Other customized language models may additionally or alternatively be built.

Upon generation of the lexicon and the customized language model, a speech recognition and translation service may access the generated lexicon, the customized language model, a generic language model, and/or any applicable user profile data. Utilizing this information, the speech recognition and translation service may facilitate real-time identification and translation of utterances between the first user and the second user. Real-time refers to fast translation occurring substantially at the pace of the conversation or with negligible latency. The real-time identification and translation can include ranking of individual named entities based on a number of weights and switching between the generic language model and the customized language model based on a switching probability and a repeat probability. The weights may include weights based on a number of times a particular named entity was collected, the frequency of use of a particular named entity in a corpus of communication data, and other attributes. These operations reduce latency in the translation of utterances, and improve the processing speed for processing of utterances in the communication system.

The customized language model and the conversation lexicon may be periodically or continuously updated during the conversation through the communication channel, or may be updated based upon a threshold variation in a context or topic of conversation. Upon termination of the conversation or communication channel between the first user and the second user, the speech recognition and translation service, or another component, may discard the customized language model and the conversation lexicon. This may reduce an amount of memory needed to store language models. Moreover, the customized language model may include personal information of the users, such as names of contacts (e.g., telephone contacts, email contacts, social media contacts, etc.), locations, products, and other entities. Accordingly, discarding the customized language model and the conversation lexicon may ensure privacy.

The customized language model and conversation lexicon, and information pertaining thereto, may be accessible only if privacy concerns are satiated. For example, the user may indicate a level of security selections or privacy selections governing the accessibility of previous conversation information or other private information. Furthermore, the user may indicate a preference of allowing access to emails, social media contacts, voice mail, short messaging system (SMS) text messages, instant messaging text messages, and other information. Additionally, other privacy settings may include only allowing access to previous conversation information of users belonging to the same organization or enterprise. Other privacy settings may also be implemented to prevent access to information deemed private. Additionally, a user may "opt in" to utilize the translation technologies described herein, through a user agreement stipulating privacy settings or denoting a level of access to private information. Furthermore, a summary of any collected information may be provided to a user who does opt in or provide consent to access to personal or private information.

The speech recognition and translation service, the cross-language lexicon service, and the customized language model service may be deployed on a computing network, such as a distributed computing network. Furthermore, each of these services may be deployed as a program module or software component.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, circuits, and other types of software and/or hardware structures that perform particular tasks or implement particular data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration as specific implementations or examples. Referring now to the drawings, aspects of a computing system and methodology for cross-language speech recognition and translation will be described in detail.

Figure 1B:
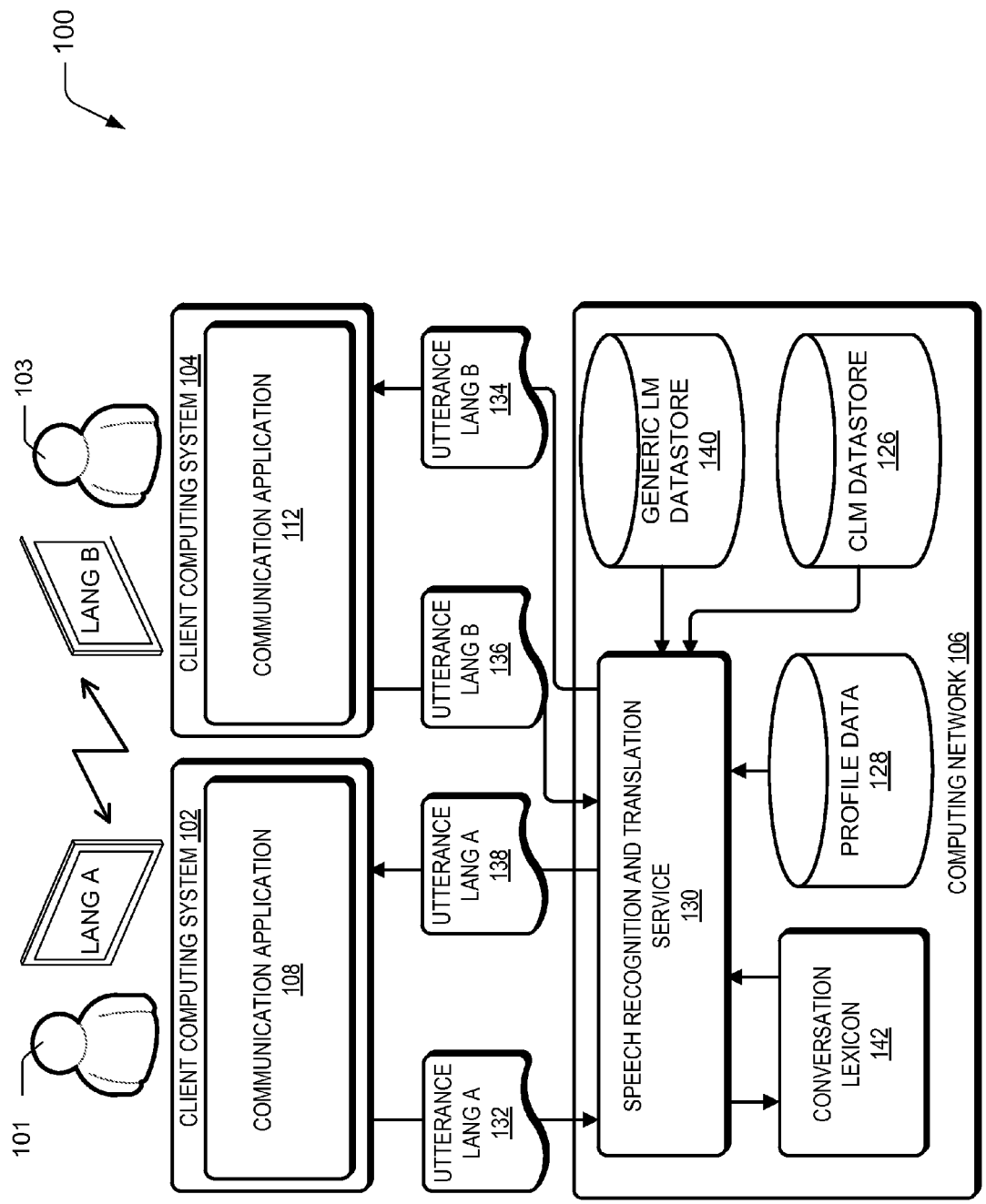
FIG. 1B is a diagram showing additional aspects of the illustrative operating environment of FIG. 1A provided by the technologies described herein.

FIGS. 1A and 1B illustrate operating environments and several logical components provided by the technologies described herein. In particular, FIG. 1A is a diagram showing aspects of a speech recognition and translation system 100, provided by the technologies described herein. As shown in the system 100, a client computing system 102 and a client computing system 104 may be arranged to communicate with a computing network 106.

The client computing system 102 and the client computing system 104 may include any suitable computing system, such as a personal computer, laptop computer, tablet, gaming console, mobile device, or other computing device. An example computing device is described below with reference to FIG. 6. The computing network 106 may include a distributed computing network or "computing cloud," in some implementations. The computing network 106 may therefore include one or more computing devices arranged to communicate across a wired and/or wireless communications network and arranged to process information in a distributed manner. Other forms of the computing network 106 are also applicable under some circumstances.

Generally, the client computing system 102 may include a communication application 108 and one or more named entity sources 110 executing thereon, and may be associated with a first user 101 speaking a first language LANG A. The communication application 108 may be a video chat application, an audio chat application, a textual chat application, or any other suitable communication application or combination thereof. According to one particular example, the communication application 108 is SKYPE by MICROSOFT CORPORATION. According to other examples, the communication application 108 is GOOGLE HANGOUTS by GOOGLE, FACETIME by APPLE, WHATSAPP by FACEBOOK, and/or any other suitable communication application.

The named entity sources 110 may include any suitable sources. Example named entity sources include a contact list. The contact list may include email contacts, phone contacts, gaming contacts, and/or information from social networking websites or social media. The contact list can include individual named entities representative of persons, for example, or organizations. Another named entity source 110 may be a corpus of location information, for example, as included in the contact list or in an address book application. The location information may also be included in a user profile of a user accessing the communication application 108 at the client computing system 102. The user profile may include data identifying a geographical location of the user or of the physical client computing system 102. Other sources of location information can include global positioning system (GPS) coordinates, Internet Protocol (IP) address information, wireless access point connection information, cell tower or base station location information, and potentially other sources.

The named entity sources 110 may also include a corpus of previous conversations between a user accessing the communication application 108 and another user to which the first user is initializing a conversation via the communication application 108. The previous conversations can include audio information and textual information.

The previous conversations and information pertaining thereto may be accessible only if privacy concerns are satiated. For example, the user may indicate a level of security selections or privacy selections governing the accessibility of previous conversation information. Furthermore, the user may indicate a preference of allowing the communication application 108 to access emails, short messaging system (SMS) text messages, instant messaging text messages, and other information. Additionally, other privacy settings may include only allowing access to previous conversation information of users belonging to the same organization or enterprise. Other privacy settings may also be implemented to prevent access to information deemed private. Additionally, a user may be required to "opt in" to utilize the translation technologies described herein, through a user agreement stipulating privacy settings or denoting a level of access to private information.

As further shown in FIG. 1A, the client computing system 104 includes a communication application 112 and one or more named entity sources 114 executing thereon, and may be associated with a second user 103 speaking a second language LANG B. The communication application 112 may be substantially similar to the communication application 108, or they may be different. For example, the communication applications 108 and 112 may be implemented as applications running in different operating systems, as different applications running in a gaming console, or as entirely different applications configured to communicate through the computing network 106. Furthermore, the named entity sources 114 may be substantially similar to the named entity sources 110. Accordingly, the example communication applications and named entity sources listed above may also be applicable to the communication application 112 and the named entity sources 114.

The communication application 108, named entity sources 110, communication application 112, and named entity sources 114 may provide profile data 116, named entity 117, profile data 118, and named entity 119 to a named entity categorization service 120, executing or deployed on the computing network 106. The named entity categorization service may be a service or software module configured to collect and categorize the named entities 117 and 119.

The collected named entities 117 and 119 can be categorized based on the type of named entities. For example, names of people can be categorized as Person Names while name of geographic locations can be categorized as Location Names. Similarly, names of particular products or things may be categorized as Object Names. The categorization can be facilitated through identification of a source of the named entities, such as a contact list containing names and address information, location information derived from coordinates or map data, product information for recently purchased products, a context of prior conversations of one or both of a first user 101 of the client computing system 102 and a second user 103 of the client computing system 104, textual information from text-based communications associated with one or both of the first user and the second user, and potentially other sources.

Upon categorization, the categorized named entities may be stored as a portion of profile data 128 for the first user and the second user. The profile data 128 may be persistent across multiple conversations between the first user and the second user, and across multiple conversations with other users. Furthermore, the named entity categorization service 120 may also periodically update the associated profile data 128 during individual conversations or when additional named entities 117 and 119 are received from the named entity sources 110 and 114.

Stored or newly updated categorized named entities and profile data may be accessed by a cross-language lexicon service 122 and a customized language model service 124 upon initiation of a communication channel between the first user and the second user. The cross-language lexicon service 122 may combine the categorized named entities for both users. Using the combined categorized named entities, the cross-language lexicon service 122 constructs a lexicon for the initialized communication channel with a pronunciation of at least a portion of the named entities in both the first language and the second language. Construction of the lexicon is described more fully with reference to FIG. 3.

The customized language model service 124 utilizes the categorized named entities to build a customized language model for real-time speech translation that may be stored at the CLM datastore 126. The customized language model, or CLM, can include a context-free language model, or an n-gram language model (e.g., a class-based language model).

A context-free language model can utilize a language model format comprising a prefix, named entity name, and possibly a suffix. The prefix and suffix may be varied to include a number of possible natural expressions, such as "Hello," if preceding a person's name or "travelling to," if preceding a location's name. An example expression in a context-free language model may include, "<PREFIX> John Smith <SUFFIX>." Another expression may include "<PREFIX> Amarillo, Tex."

An n-gram language model may utilize a named entity tagger to identify named entities within a language corpus and replace such named entities with a category place holder such as PERSON_NAME or LOCATION_NAME instead of prefixes or suffixes being identified. For example, an expression "He will meet John Smith in Amarillo, Tex. next week," would be replaced with "He will meet <PERSON_NAME> in <LOCATION_NAME> next week." Other language models may also be used.

The customized language models at CLM datastore 126 may only be stored during a lifetime of a conversation between the first user and the second user. Upon termination of the conversation, any customized language models may be discarded. In this manner, privacy associated with both users is maintained, the customized language models are ephemeral, and memory requirements are minimized.

As explained briefly above, both the conversation lexicon and the customized language model may be used during real-time speech translation. Real-time speech translation operations are described more fully with reference to FIG. 1B. FIG. 1B is a diagram showing additional aspects of the system 100, provided by the technologies described herein. As shown, a speech recognition and translation service 130 is deployed at the computing network 106.

The speech recognition and translation service 130 is arranged to access the CLM datastore 126, the profile data 128, a generic language model datastore 140, and conversation lexicon 142. The generic language model datastore 140 may provide a generic language model arranged for translation between a first language (LANG A) spoken by the first user and a second language (LANG B) spoken by the second user. According to some implementations, the first language and the second language are different languages. According to at least one implementation, the first language and the second language are the same language. For example, if the first language and the second language are the same language, regional pronunciations and dialects may be considered during translation. Furthermore, although described as being related to the two languages LANG A and LANG B, these technologies are also applicable to more than two languages. For example, either speaker may speak more than one language, or more than one speaker each speaking a different language may also communicate through the technologies described herein, without departing from the scope of this disclosure. The conversation lexicon 142 may include the lexicon provided by the cross-language lexicon service 122. The conversation lexicon 142 may also be ephemeral, and may be discarded upon termination of the conversation between the first user and the second user.

Generally, the speech recognition and translation service 130 may receive and optionally translate utterances made between the first user and the second user using the communication applications 108 and 112. For example, the first user may create an utterance in LANG A 132 and direct the utterance 132 to be transmitted to the second user. The speech recognition and translation service 130 may receive utterance 132, translate the utterance 132 using the generic language model, the customized language model, profile data, and the conversation lexicon 142, to create utterance 134 in LANG B. The speech recognition and translation service 130 may then transmit utterance 134 to the second user at communication application 112. Generally, the utterance 132 may include a name of a named entity in LANG B, or pronounced according to LANG B, in some examples.

To illustrate how this technique may be applicable, consider an example in which an English speaker is talking with a French speaker. They are both talking about a mutual friend whose name is "Karen." In French this is pronounced "Kareen." Therefore, in existing speech recognition systems, the French speaker would need to say "Kareen" to have the name correctly recognized, and the English speaker would have to pronounce the name in the normal English way. However this is not how normal conversations go—both parties are likely to pronounce the name the same way. For example, if the Karen in question is an American, both speakers are likely to say "Karen" and the French speaker's utterance will not be properly recognized by the French speech recognition system. If the person they are talking about is French, both parties are likely to say "Kareen," and the English speech recognition system will not recognize the English speaker's utterance.

Using the customized language model, the speech recognition and translation service may be able to identify the name of the named entity pronounced according to LANG B, even though the utterance 132 is predominantly in LANG A. Thus, miscommunication of utterances of names of named entities may be reduced.

Similarly, the second user may create utterance 136 in LANG B, and may direct the utterance 136 to be transmitted to the first user. The speech recognition and translation service 130 may receive utterance 136, translate the utterance 136 using the generic language model, the customized language model, profile data, and the conversation lexicon 142, to create utterance 138 in LANG A. The speech recognition and translation service 130 may then transmit utterance 138 to the first user at communication application 108. Similar to the example described above, the utterance 136 may include a name of a named entity in LANG A, or pronounced according to LANG A, in some examples. Using the customized language model, the speech recognition and translation service may be able to identify the name of the named entity pronounced according to LANG A, even though the utterance 136 is predominantly in LANG B. Thus, miscommunication of utterances of names of named entities may be reduced.

The system 100 may include more or fewer components than those illustrated in FIGS. 1A and 1B. Furthermore, particular operations and data flows described above with reference to the system 100 may be altered without departing from the scope of this disclosure. Hereinafter, a more detailed description of the operation of the components of the system 100 is provided with reference to FIGS. 2-4.

Figure 2:
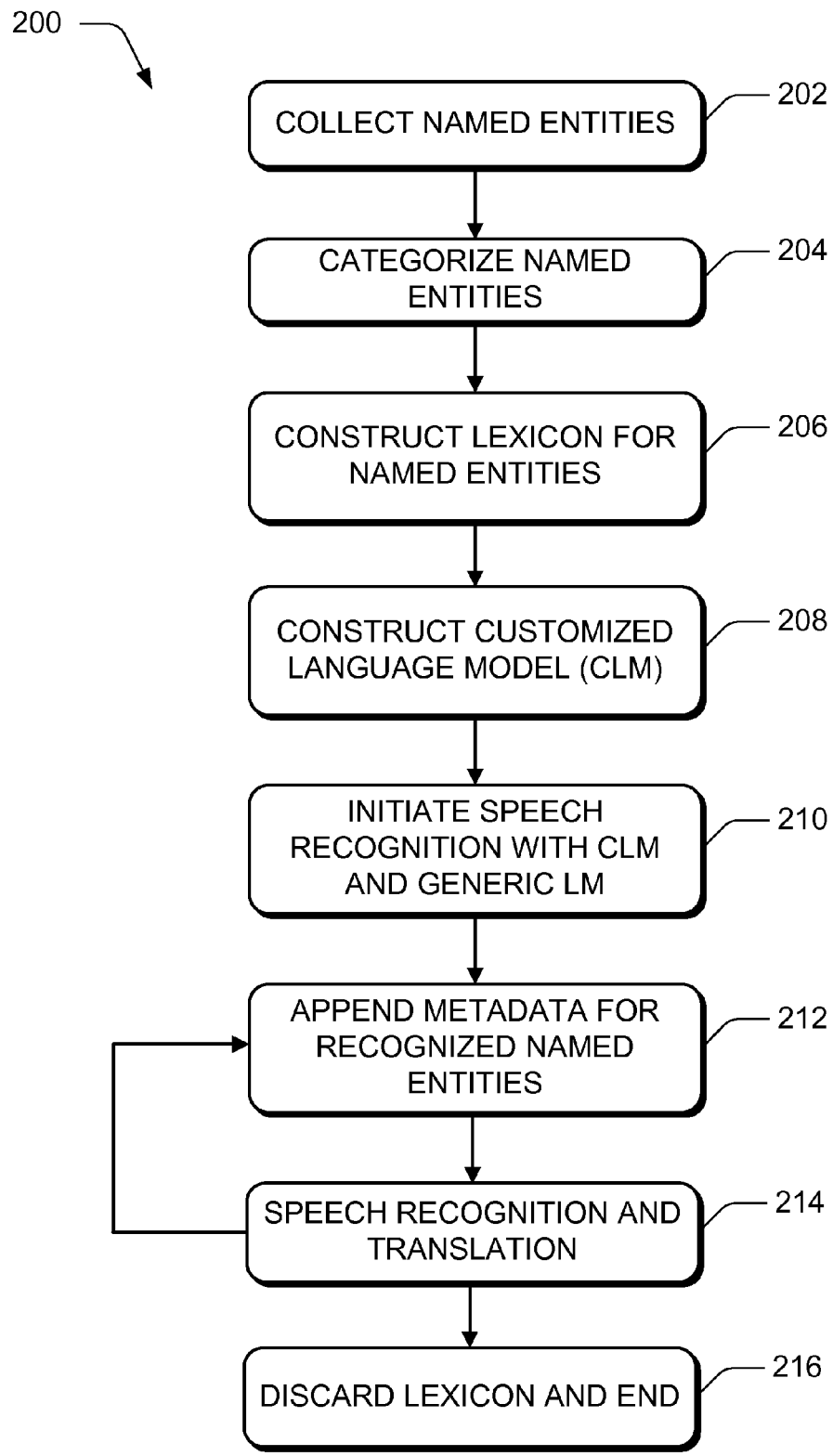
FIG. 2 is a flowchart showing aspects of one illustrative routine for cross-language speech recognition and translation, according to one implementation presented herein.

FIG. 2 is a flowchart showing aspects of one illustrative routine, or method, 200 for cross-language speech recognition and translation, according to one implementation presented herein. The method 200 includes collecting named entities by the named entity categorization service 120, at block 202.

Generally, the named entity categorization service 120 may collect named entities 117 and 119 from named entity sources 110 and 114, respectively. The sources can include any of the sources described above, and as deemed accessible in light of any privacy concerns or user privacy settings.

The named entity categorization service 120 may then categorize each collected named entity, at block 204. For example, a named entity tagger may be used to categorize each named entity as a Person Name, a Location Name, or Other Name. An entity categorized as Other Name may be an out of vocabulary name (OOV), for example. The named entity tagger may include any available or suitable named entity tagger.

Thereafter, the cross-language lexicon service 122 may construct a conversation lexicon 142 for a conversation being initiated between the first user and the second user, at block 206. The construction of the conversation lexicon 142 is described more fully with reference to FIG. 3.

Upon construction of the lexicon 142, or at substantially the same time, the customized language model service 124 may construct a customized language model for storage at the CLM datastore 126, at block 208. For example, the customized language model may include a context-free language model or an n-gram language model arranged and formatted as described above. In other examples, other types of language models may be used.

Utilizing the conversation lexicon 142, the customized language model, and an available generic language model, the speech recognition and translation service 130 initiates speech recognition and translation, between the first user and the second user, at block 210. The speech recognition may include receiving utterances from one user and the speech translation may include translating the received utterances to a language associated with the other user. Under some circumstances, the first and second user may use the same language, and thus the translating can include applying regional dialects or proper pronunciation of miscommunicated phrases or terms. Real-time translation is described more fully with reference to FIGS. 4 and 5.

During speech recognition and translation, the speech recognition and translation service 130 may append metadata for recognized named entities at block 212. The metadata may be formatted according to the Extensible Markup Language (XML) format, and may include any suitable data related to the named entities. The metadata can include, for example, segmentation in phrases, punctuation in phrases, information about a named entity, and/or start and end points for named entities comprising multiple words for a single name (e.g., "Los Angeles Calif.," or other names).

The speech recognition and translation service 130 may continue speech recognition and translation while appending additional metadata, as illustrated at blocks 212 and 214, until a termination in the conversation. Upon termination, the conversation lexicon 142 and any associated customized language models are discarded and the method 200 ceases, at block 216.

Figure 3:
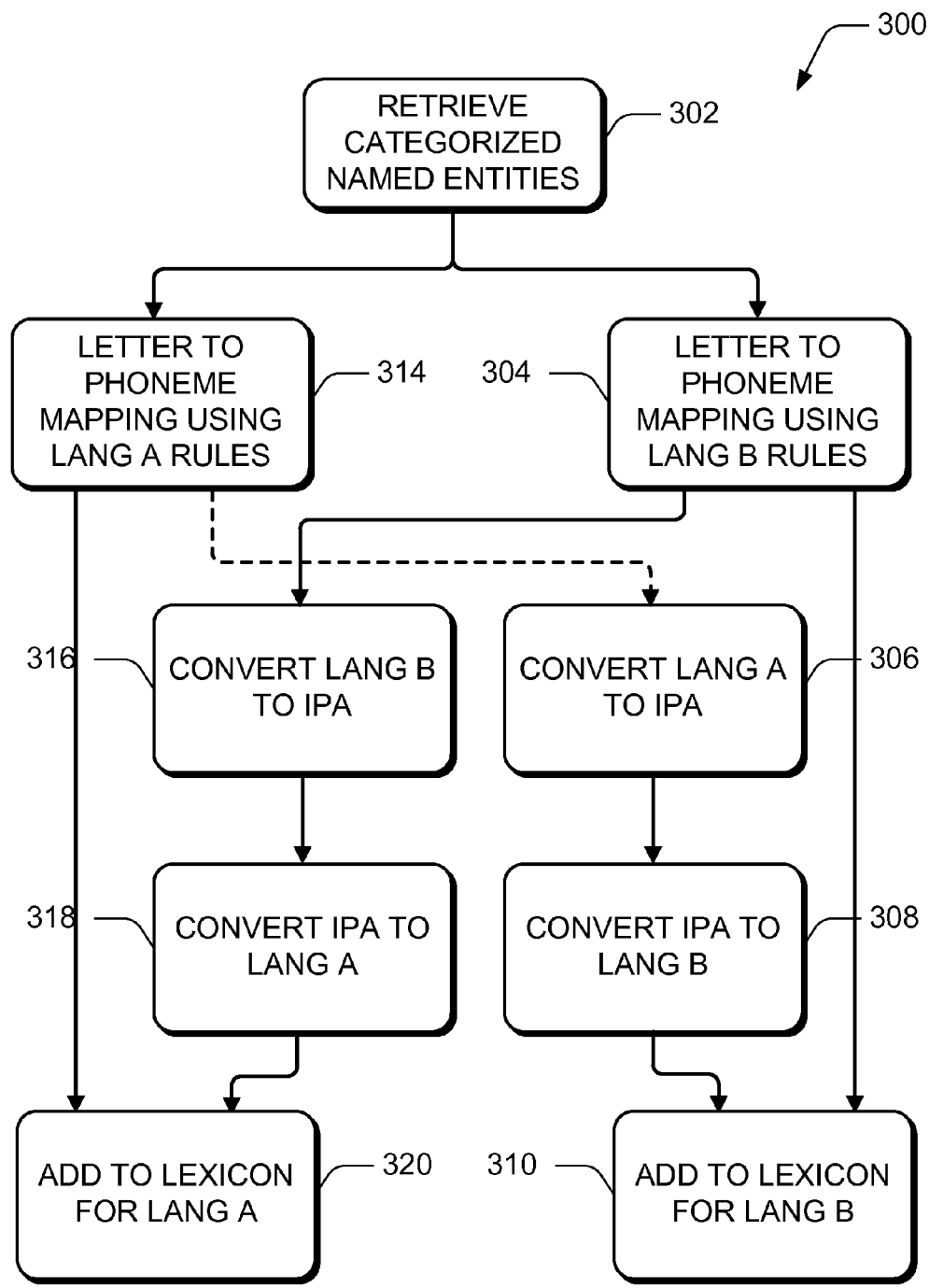
FIG. 3 is a flowchart showing aspects of one illustrative routine for constructing a lexicon for named entities, according to one implementation presented herein.

FIG. 3 is a flowchart showing aspects of one illustrative routine, or method, 300 for constructing a lexicon for named entities, according to one implementation presented herein. Generally, the method 300 may be performed by the cross-language lexicon service 122 for construction of the conversation lexicon 142. The method 300 includes two stages of translation to create a lexicon 142 of pronunciations of names for named entities using cross-language phonetic representations. If both users engaging in a conversation speak the same language, other pronunciation differences taking into account regional dialects may be facilitated without departing from the scope of this disclosure. Accordingly, while described as "cross-language" for the sake of clarity, translations of pronunciations of names between the same language are also possible.

As illustrated, the left portion of FIG. 3, including blocks 314, 316, 318, and 320, represents construction of lexicon for LANG A as described above. The right portion of FIG. 3, including blocks 304, 306, 308, and 310, represents construction of lexicon for LANG B as described above. The lexicon for LANG A and LANG B may be combined to create lexicon 142, or may be maintained separately.

Generally, the method 300 includes retrieving a plurality of categorized named entities at block 302. The categorized named entities may be stored with profile data 128. The method 300 further includes mapping letters to phonemes using a set of language rules for LANG B, at block 304. For example, the categorized named entities that include names in LANG B are processed to include LANG B phonemes and added to the lexicon for LANG B at block 310. Additionally, the names in LANG B are converted to the international phonetic representations as described by the INTERNATIONAL PHONETIC ASSOCIATION (IPA), at block 316. Upon conversion, the international phonetic representations are converted to phonemes of LANG A, at block 318. The phonemes for LANG A are then added to the lexicon for LANG A, at block 320.

As an example, Table 1 represents an example mapping between English and the IPA phonemes, below:

TABLE 1

Example mapping table between English phonemes and IPS

| IPS Phonemes | English Phonemes |
|---|---|
| AA | a |
| Q | a |
| OE | a |
| AX | a |
| AEX | a |
| AE | a |
| A | a |
| AA + I | aj |
| A + J | aj |
| AI | aj |

In this manner, phonetic representations of names for named entities originally associated with LANG B, are now available in LANG A. These names may therefore be appropriately recognized and/or optionally translated with a correct pronunciation. For example, if a named entity of "David" were included in English, an appropriate pronunciation of "David" in Spanish may be stored as phonetic representations in the lexicon for LANG A, if LANG B were English and LANG A were Spanish. Furthermore, regional variations for the pronunciation of the named entity of "David" could also be possible, depending upon profile data 128 associated with the first and second users engaging in the example conversation.

As further shown in FIG. 3, the method 300 further includes mapping letters to phonemes using a set of language rules for LANG A, at block 314. For example, the categorized named entities that include names in LANG A are processed to include LANG A phonemes and added to the lexicon for LANG A at block 320. Additionally, the names in LANG A are converted to the international phonetic representations as described by the INTERNATIONAL PHONETIC ASSOCIATION, at block 306. Upon conversion, the international phonetic representations are converted to phonemes of LANG B, at block 308. The phonemes for LANG B are then added to the lexicon for LANG B, at block 310.

In this manner, phonetic representations of names for named entities originally associated with LANG A, are now available in LANG B. These names may therefore be appropriately recognized and/or optionally translated with a correct pronunciation. For example, if a named entity of "Amarillo Texas" were included in English, an appropriate pronunciation of "Amarillo Texas" in Spanish may be stored as phonetic representations in the lexicon for LANG B, if LANG A were English and LANG B were Spanish. Furthermore, regional variations for the pronunciation of the named entity of "Amarillo Texas" could also be possible, depending upon profile data 128 associated with the first and second users engaging in the example conversation.

Additionally, particular weights can be associated with particular names of named entities for each language in the lexicon 142. The weights may be useful in translation and recognition, and may represent a ranking of particular names that may be pronounced in a particular language or dialect. The weights may be based on various sources, such as the frequency of the names occurring in a corpus of text and/or how frequently a speaker uses or utters the names.

The method 300 may iterate throughout a conversation and as named entities are identified and categorized by the named entity categorization service 120. However, as presented above, the lexicon 142 for either of LANG A or LANG B may be discarded upon termination of a conversation. This may reduce memory requirements and ensure privacy.

The lexicon 142 may be used by the speech recognition and translation service 130 to promote recognition based on the correct pronunciation of names of named entities during a conversation. Hereinafter, runtime speech recognition and translation is described more fully with reference to FIGS. 4 and 5.

Figure 4:
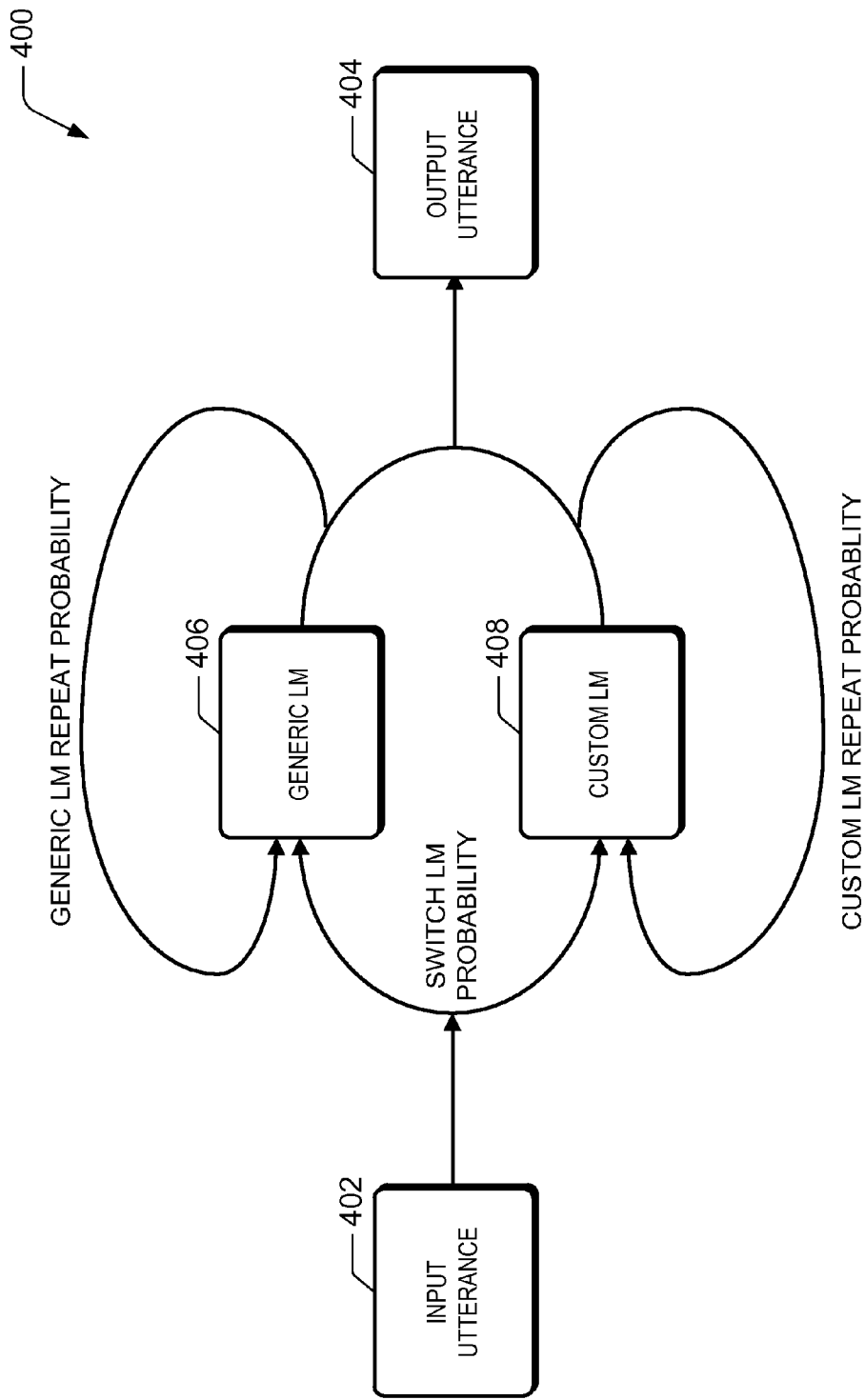
FIG. 4 is a diagram illustrating real-time speech translation using a generic language model and a customized language model, according to one implementation presented herein.

FIG. 4 is a diagram 400 illustrating real-time speech recognition and translation using a generic language model and a customized language model, according to one implementation presented herein. As shown, an input utterance 402 may be received by the speech recognition and translation service 130. Depending upon a switching probability, a generic language model 406 or a customized language model 408 may be used to translate the input utterance 402.

The switching probability can be based on a number of factors, and may be weighted either towards or away from the customized language model depending upon an identified topic of conversation. For example, a topic of conversation heavily utilizing named entities may include a switching probability that indicates it is more probable a named entity needs to be translated. Similarly, a topic of conversation absent many named entities may include a switching probability that indicates it is more probable generic terms need to be translated.

Utilizing either the generic language model 406 or the customized language model 408, the speech recognition and translation service 130 translates at least a portion of the utterance to create an output utterance 404 for transmission to a communication application. If only a portion of the utterance has been translated, a repeat probability of repeating translation using either the generic language model 406 or the custom language model 408 indicates whether translation using either model should be repeated to finalize translation and creation of the utterance 404. Furthermore, the utterance 404 may include pronunciations based on the lexicon 142 if the utterance 404 identifies a name of a named entity.

The diagram 400 has been simplified to show aspects of real-time translation using two distinct language models. However, a single generic language model augmented using the lexicon 142 of pronunciations may be appropriate for some implementations. In such an implementation, the switching probability for using the generic language model may be "1". Other implementations having more complex flows between language models may also be applicable.

Figure 5:
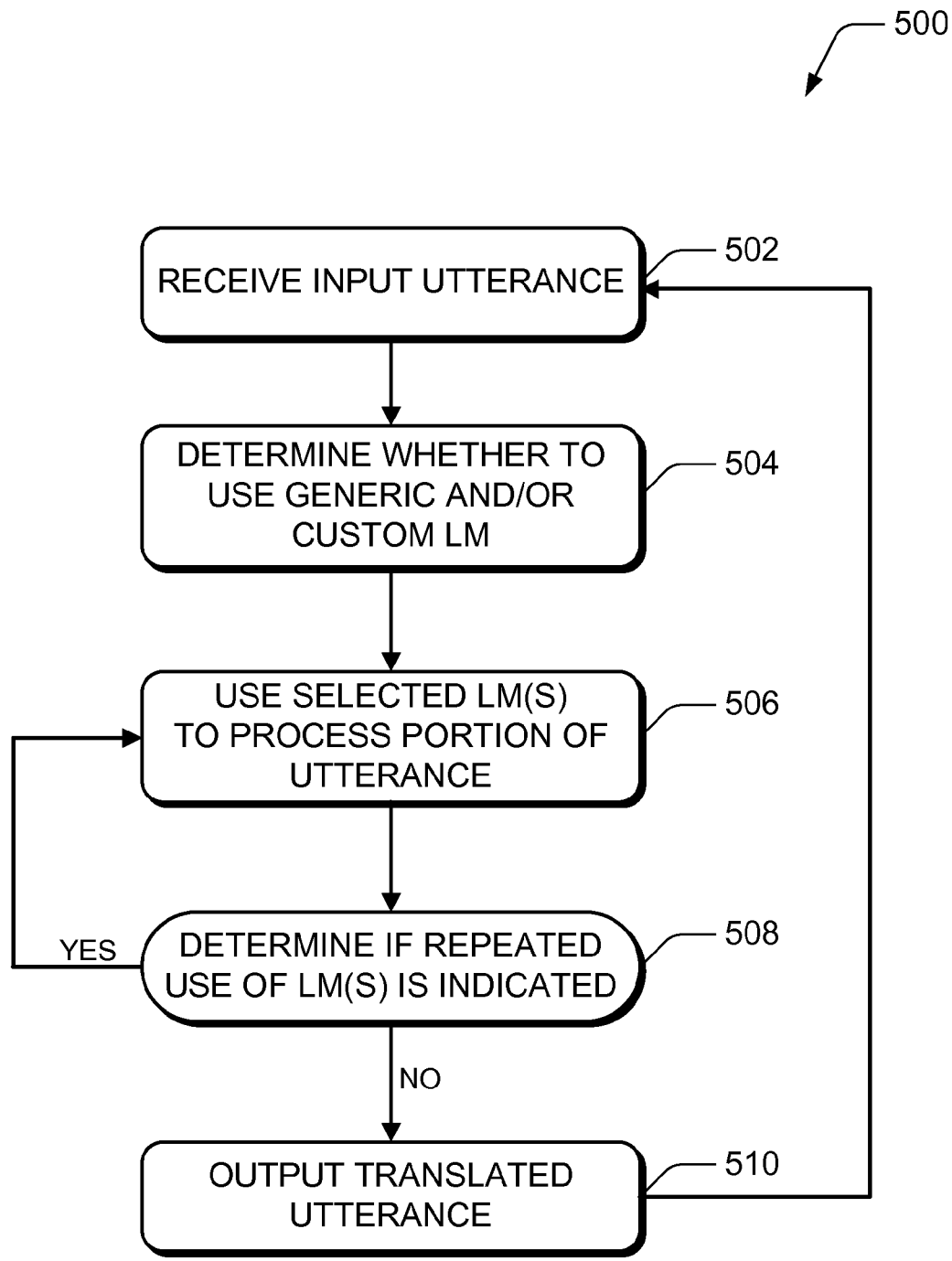
FIG. 5 is a flowchart showing aspects of one illustrative routine for real-time speech translation using a generic language model and a customized language model, according to one implementation presented herein.

FIG. 5 is a flowchart showing aspects of one illustrative routine, or method, 500 for real-time speech recognition and translation using a generic language model and a customized language model, according to one implementation presented herein. The method 500 operates in a similar manner to the diagram 400. For example, the method 500 may include receiving an input utterance at bock 502. Thereafter, the speech recognition and translation service 130 may determine whether to use the generic language model or the customized language model at block 504.

The speech recognition and translation service 130 utilizes the selected language model to translate a portion of the input utterance, at block 506. The speech recognition and translation 130 then determines if repeated use of the selected language model is indicated, at block 508. If indicated, additional portions of the input utterance are translated at block 506. During the translation, the speech recognition and translation service identifies one or more names of named entities from the input utterance, as well. The identification is based on both languages LANG A and LANG B, such that even if a speaker of LANG A utters a name pronounced in LANG B, the name may be correctly recognized. Upon identification, the speech recognition and translation service 130 adds a phonetic representation of the names to the output utterance. As described above, the phonetic representation includes a pronunciation of each name in the appropriate language.

If no additional translations or recognitions are indicated, the speech recognition and translation service 130 outputs the translated utterance at block 510. The method 500 may continually iterate until termination of the conversation.

It should be appreciated that the logical operations described above may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
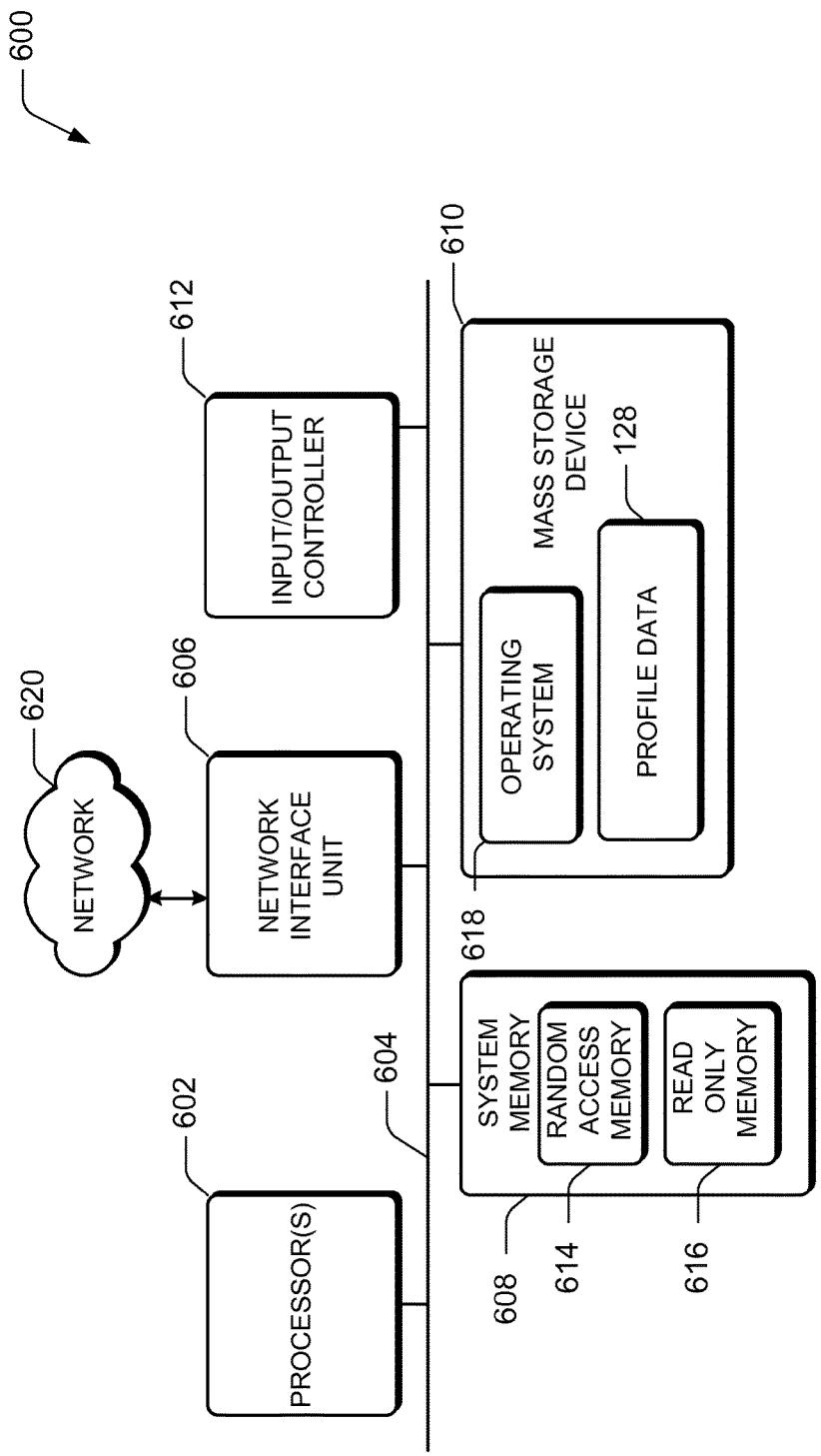
FIG. 6 is a computer architecture diagram showing an illustrative computer hardware and software architecture.

FIG. 6 shows an illustrative computer architecture for a computer 600 capable of executing the software components and methods described herein for cross-language speech recognition and translation in the manner presented above. The computer architecture shown in FIG. 6 illustrates a conventional desktop, laptop, or server computer and may be utilized to execute any aspects of the software components presented herein described as executing in the system 100 or any components in communication therewith.

The computer architecture shown in FIG. 6 includes one or more processors 602, a system memory 608, including a random access memory 614 ("RAM") and a read-only memory ("ROM") 616, and a system bus 604 that couples the memory to the processor(s) 602. The processor(s) 602 can include a central processing unit (CPU) or other suitable computer processors. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the processor(s) 602 through a mass storage controller (not shown) connected to the bus 604. The mass storage device 610 is an example of computer-readable media for the computer 600. Although the description of computer-readable media contained herein refers to a mass storage device 600, such as a hard disk, compact disk read-only-memory (CD-ROM) drive, solid state memory (e.g., flash drive), it should be appreciated by those skilled in the art that computer-readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media.

By way of example, and not limitation, computer storage media includes volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory (EPROM), electrically erasable programmable read-only memory (EEPROM), flash memory or other solid state memory technology, CD-ROM, digital versatile disks ("DVD"), High Definition DVD (HD-DVD), BLU-RAY, or other optical storage, magnetic cassettes, magnetic tape, magnetic disk storage or other magnetic storage devices, or any other medium that can be used to store the desired information and which can be accessed by the computer 600. As used herein, the phrase "computer storage media," and variations thereof, does not include waves or signals per se and/or communication media.

According to various implementations, the computer 600 may operate in a networked environment using logical connections to remote computers through a network such as the network 620. The computer 600 may connect to the network 620 through a network interface unit 606 connected to the bus 604. The network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 814 may also store one or more program modules or other data, such as the profile data 128 or any ephemeral data, described above. The mass storage device 610 and the RAM 614 may also store other types of program modules, services, and data.

Example Clauses

A. A device for speech recognition comprising a speech recognition component deployed thereon and configured to: receive an input utterance in a first language, the input utterance having at least one name of a named entity included therein and being pronounced in a second language; utilize a customized language model to process at least a portion of the input utterance; and identifying the at least one name of the named entity from the input utterance utilizing a phonetic representation of the at least one name of the named entity, the phonetic representation having a pronunciation of the at least one name in the second language.

B. A device as paragraph A recites, wherein the speech recognition component is further configured to: create an output utterance based on the input utterance, the output utterance comprising one or more of: a phonetic representation of the at least one name of the named entity in the second language; or a phonetic representation of the at least one name of the named entity in the first language.

C. A device as either of paragraphs A and B recites, wherein the customized language model comprises a context-free language model or an n-gram language model.

D. A device as any of paragraphs A-C recites, wherein the speech recognition component is further configured to: retrieve the phonetic representation from a lexicon of phonetic pronunciations of names for named entities, the lexicon including a plurality of pronunciations in both the first language and the second language for the same names of named entities.

E. A device as any of paragraphs A-D recites, wherein the speech recognition component is further configured to output an output utterance comprising the at least one name of the named entity to a communication application in operative communication with the computer.

F. A method of speech recognition and translation for processing utterances in both a first language and a second language, the method comprising performing computer-implemented operations at a computing network including: categorizing names of named entities associated with a first user, the names being in the first language; constructing a lexicon of phonetic pronunciations of the names for the named entities, the lexicon including a plurality of pronunciations in the first language and the second language; constructing a customized language model for each type of named entity of the named entities; and processing utterances received from the first user in the first language to recognize names of named entities, the names of named entities comprising names pronounced in the second language.

G. A method as paragraph F recites, further comprising: collecting the names of the named entities from one or more sources of named entities, the one or more sources of named entities being associated with the first user.

H. A method as either of paragraphs F and G recites, wherein the one or more sources of named entities comprises at least one of: a contact list associated with the first user; location information associated with the first user; conversation data associated with the first user; or social media data associated with the first user.

I. A method as any of paragraphs F-H recites, wherein the utterances received from the first user are created in a communication application, and wherein the one or more sources of named entities are retrieved from the communication application.

J. A method as any of paragraphs F-I recites, wherein categorizing the named entities comprises categorizing named entities as a name of a person or a name of a geographic location.

K. A method as any of paragraphs F-J recites, wherein categorizing the named entities further comprises categorizing named entities as out of vocabulary (OOV) entities.

L. A method as any of paragraphs F-K recites, wherein constructing the lexicon of phonetic pronunciations comprises: mapping letters of a name of a named entity using a set of language rules for the first language; converting the mapped letters of the name to a standard phonetic representation; converting the standard phonetic representation to a phonetic representation of pronunciation in the second language; and adding the phonetic representation of the pronunciation to the lexicon of phonetic pronunciations.

M. A method as any of paragraphs F-L recites, further comprising: categorizing new names of named entities associated with a second user, the new names being in the second language; and constructing a lexicon of phonetic pronunciations for the named entities, the lexicon including a plurality of pronunciations in the first language and the second language.

N. A method as any of paragraphs F-M recites, further comprising: constructing the customized language model for at least one type of named entity of the new names of named entities.

O. A method as any of paragraphs F-N recites, further comprising: translating utterances received from the second user in the second language to new output utterances in the first language, the new output utterances comprising at least one phonetic pronunciation of a new name of the named entities in the first language.

P. A speech recognition and translation system configured to translate a first utterance in a first language into a second utterance in a second language, the system comprising at least one computer executing a speech recognition component configured to: receive an input utterance in the first language, the input utterance having at least one name of a named entity included therein; utilize a customized language model or a generic language model to translate a portion of the input utterance into an output utterance in the second language; identify the at least one name of the named entity from the input utterance; determine a phonetic representation of the at least one name of the named entity to the output utterance, the phonetic representation having a pronunciation of the at least one name in the second language; and output the output utterance according to the phonetic representation.

Q. A system as paragraph P recites, further comprising a named entity categorization component configured to categorize names of named entities as a name of a person, a name of a geographic location, or the name of an object.

R. A system as either of paragraphs P and Q recites, further comprising a cross-language lexicon component configured to construct a lexicon of phonetic pronunciations of names for named entities, the lexicon including a plurality of pronunciations in the second language.

S. A system as any of paragraphs P-R recites, wherein constructing the lexicon of phonetic pronunciations comprises: mapping letters of a name of a named entity using a set of language rules for the first language; converting the mapped letters of the name to a standard phonetic representation; converting the standard phonetic representation to a phonetic representation of pronunciation in the second language; and adding the phonetic representation of the pronunciation to the lexicon of phonetic pronunciations.

T. A system as any of paragraphs P-S recites, further comprising a customized language model component configured to construct the customized language model.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully or partially automated via, software code modules executed by one or more general purpose computers or processors. The code modules may be stored in any type of computer-readable storage medium or other computer storage device. Some or all of the methods may additionally or alternatively be embodied in specialized computer hardware.

Conditional language such as, among others, "can," "could," or "may," unless specifically stated otherwise, means that certain examples include, while other examples do not include, certain features, elements and/or steps. Thus, such conditional language does not imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrases "and/or" and "at least one of X, Y or Z," unless specifically stated otherwise, mean that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device for speech recognition comprising at least one processor execute instructions, wherein the instructions configure the at least one processor to:
   receive an input utterance in a first language, the input utterance having at least one name of a named entity including a pronunciation in a second language;
   identify the at least one name using a named entity source;
   utilize a customized language model, stored in a database, to process a first portion of the input utterance including the at least one name in response to the at least one name being identified using the named entity source;
   utilize a generic language model corresponding to the first language to process a second portion of the input utterance;
   identify, by accessing a cross-language lexicon, that the at least one name of the named entity from the input utterance is pronounced in the second language;
   map letters from the at least one name to a phonetic representation using the pronunciation in the second language and a set of language rules for the first language;
   store, in the database, the phonetic representation of the at least one name of the named entity to be used in the customized language model, the phonetic representation using phonemes of the first language to represent the pronunciation of the at least one name in the second language, wherein the phonemes of the first language used to represent the pronunciation of the at least one name in the second language differ from phonemes of the first language used to represent a pronunciation of the at least one name in the first language; and
   output the phonetic representation to a communication application for displaying or transmitting text of the input utterance or a translation of the input utterance.

2. The device of claim 1, wherein the at least one processor is further configured to:
   create an output utterance based on the input utterance, the output utterance comprising one or more of:
   a phonetic representation of the at least one name of the named entity the second language; or
   a phonetic representation of the at least one name of the named entity in the first language.

3. The device of claim 1, wherein the customized language model comprises a context-free language model or an n-gram language model.

4. The device of claim 1, wherein the at least one processor is further configured to:
   retrieve the phonetic representation from a lexicon of phonetic pronunciations of names for named entities, the lexicon including a plurality of pronunciations in both the first language and the second language for the same names of named entities.

5. The device of claim 1, wherein the at least one processor is further configured to output an output utterance comprising the at least one name of the named entity to a communication application in operative communication with a remote computer.

6. The device of claim 1, wherein the at least one processor is further configured to generate the customized language model based on names in a contact list of the device.

7. A method of speech recognition and translation for processing utterances in both a first language and a second language, the method comprising performing computer-implemented operations at a computing network including:
   categorizing names of named entities associated with a first user, the names being in the first language;
   constructing a lexicon of phonetic pronunciations of the names for the named entities, the lexicon including a mapping of letters from the names to respective phonetic representations of the names for the named entities pronounced in the second language using phonemes of the first language;
   constructing a customized language model for each type of named entity of the named entities to be used to process the names;
   storing the customized language model for each type of named entity of the named entities in a database with the phonetic representations of the names; and
   processing an utterance received from the first user in the first language including a name of a named entity including a pronunciation in the second language using a customized language model corresponding to the named entity in response to the name being identified using the lexicon and using on a set of language rules for the first language, wherein phonemes of the first language used to represent a pronunciation of the name of the named entity in the second language differ from phonemes of the first language used to represent a pronunciation of the name of the named entity in the first language; and outputting the phonetic representation corresponding to phonemes of the first language used to represent the name of the named entity in the second language to a communication application for displaying or transmitting text of the utterance or a translation of the utterance.

8. The method of claim 7, further comprising:
collecting the names of the named entities from one or more sources of named entities; the one or more sources of named entities being associated with the first user.

9. The method of claim 8, wherein the one or more sources of named entities comprises at least one of:
a contact list associated with the first user;
location information associated with the first user;
conversation data associated with the first user; or
social media data associated with the first user.

10. The method of claim 8, wherein the utterances received from the first user are created in a communication application, and wherein the one or more sources of named entities are retrieved from the communication application.

11. The method of claim 7, wherein categorizing the named entities comprises categorizing named entities as a name of a person or a name of a geographic location.

12. The method of claim 11, wherein categorizing the named entities further comprises categorizing named entities as out of vocabulary (OOV) entities.

13. The method of claim 7, wherein constructing the lexicon of phonetic pronunciations comprises:
mapping letters of a second name of a second named entity using a set of language rules for the first language;
converting the mapped letters of the second name to a standard phonetic representation;
converting the standard phonetic representation to a phonetic representation of pronunciation in the second language; and
adding the phonetic representation of the pronunciation to the lexicon of phonetic pronunciations.

14. The method of claim 7, further comprising:
categorizing new names of named entities associated with a second user, the new names being in the second language; and
constructing a lexicon of phonetic pronunciations for the named entities, the lexicon including respective phonetic representations of the names for the named entities pronounced in the first language using phonemes of the second language.

15. The method of claim 14, further comprising:
constructing the customized language model for at least one type of named entity of the new names of named entities.

16. The method of claim 15, further comprising:
translating utterances received from the second user in the second language to new output utterances in the first language, the new output utterances comprising at least one phonetic pronunciation of a new name of the named entities in the first language.

17. A speech recognition and translation system configured to translate a first utterance in a first language into a second utterance in a second language, the system comprising at least one computer including at least one processor to execute instructions, wherein the instructions when executed cause the at least one processor to:
receive an input utterance in the first language, the input utterance having at least one name of a named entity including a pronunciation in a second language included therein;
identify the at least one name using a named entity source;
utilize a customized language model, stored in a database, to process a first portion of the input utterance including the at least one name in response to the at least one name being identified using the named entity source;
utilize a generic language model corresponding to the first language to translate a second portion of the input utterance into an output utterance in the second language;
identify, by accessing a cross-language lexicon, that the at least one name of the warned entity from the input utterance is pronounced in the second language;
map letters from the at least one name to a phonetic representation of the at least one name of the named entity in the second language and a set of language rules for the first language, the phonetic representation to be used in the customized language model, the phonetic representation using phonemes of the first language to represent a pronunciation of the at least one name in the second language, wherein the phonemes of the first language used to represent the pronunciation of the at least one name in the second language differ from phonemes of the first language used to represent a pronunciation of the at least one name in the first language;
store the phonetic representation in the database;
add the phonetic representation of the at least one name to the output utterance; and
output the output utterance to a communication application for displaying or transmitting text of the output utterance, the output utterance including the phonetic representation.

18. The system of claim 17, wherein the instructions further cause the at least one processor to categorize names of named entities as a name of a person, a name of a geographic location, or the name of an object.

19. The system of claim 17, further comprising wherein the instructions further cause the at least one processor to construct a lexicon of phonetic pronunciations of names for named entities, the lexicon including a plurality of pronunciations in the second language.

20. The system of claim 19, wherein operations to construct the lexicon of phonetic pronunciations comprise:
mapping letters of a name of a named entity using a set of language rules for the first language;
converting the mapped letters of the name to a standard phonetic representation;
converting the standard phonetic representation to a phonetic representation of pronunciation in the second language; and
adding the phonetic representation of the pronunciation to the lexicon of phonetic pronunciations.

* * * * *